United States Patent [19]

Stewart

[11] Patent Number: 5,739,876
[45] Date of Patent: Apr. 14, 1998

[54] METHOD OF BACKLIGHTING A DISPLAY PANEL OF AN ATM

[75] Inventor: Mark J. Stewart, Dundee, Scotland

[73] Assignee: NCR Corporation, Dayton, Ohio

[21] Appl. No.: 711,520

[22] Filed: Sep. 10, 1996

[30] Foreign Application Priority Data

May 16, 1996 [GB] United Kingdom ............ 9610240

[51] Int. Cl.⁶ .................................................. G02F 1/1335
[52] U.S. Cl. .................... 349/1; 349/67; 349/68; 349/57
[58] Field of Search ........................ 349/1, 57, 62, 349/63, 67, 68, 58; 235/379, 380, 381; 902/8; 345/32; 362/1

[56] References Cited

U.S. PATENT DOCUMENTS

| | | |
|---|---|---|
| 4,122,524 | 10/1978 | McCrory et al. ............ 349/62 |
| 4,367,923 | 1/1983 | Ishikawa et al. ............ 349/68 |
| 4,403,216 | 9/1983 | Yokoi ............ 349/62 |
| 4,997,263 | 3/1991 | Cohen et al. ............ 349/68 |
| 5,121,232 | 6/1992 | Miyadera et al. ............ 349/68 |
| 5,416,495 | 5/1995 | Davis et al. ............ 345/87 |
| 5,523,862 | 6/1996 | Narita et al. ............ 349/62 |
| 5,526,146 | 6/1996 | Goodman et al. ............ 349/5 |
| 5,650,605 | 7/1997 | Morioka et al. ............ 235/379 |

*Primary Examiner*—William L. Sikes
*Assistant Examiner*—Tai V. Duong
*Attorney, Agent, or Firm*—Michael Chan

[57] ABSTRACT

An apparatus comprises a display panel having a back side and a front side. A mirrored surface receives sunlight and reflects the sunlight towards a lens system. The lens system focuses the reflected sunlight and directs the focused light towards the back side of the display panel to provide backlighting for the display panel. The backlighting enables the front side of the display panel to be viewed with improved contrast. Preferably, the display panel is of the liquid crystal display (LCD) type, and the mirrored surface is parabolic in shape.

4 Claims, 2 Drawing Sheets

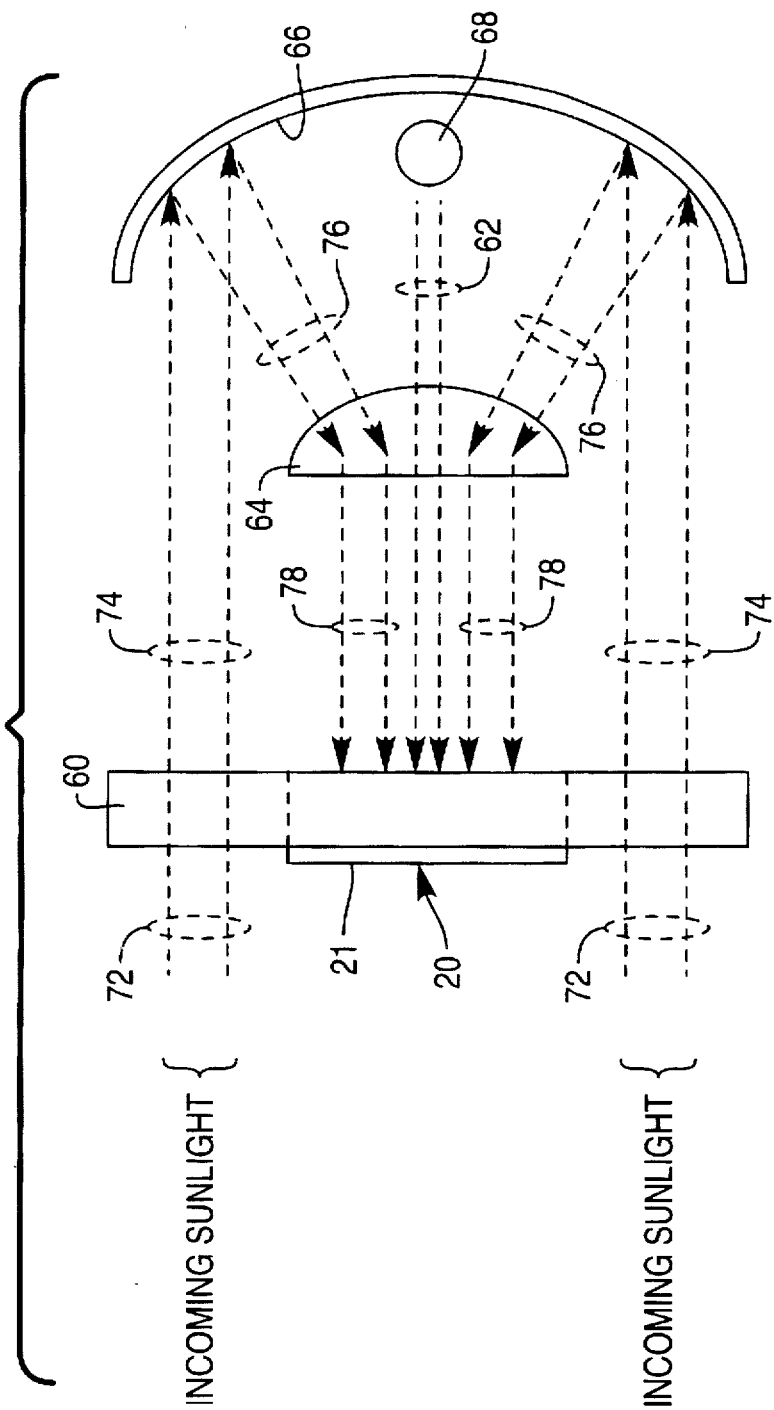

METHOD OF BACKLIGHTING A DISPLAY PANEL OF AN ATM

BACKGROUND OF THE INVENTION

The present invention relates to backlighting a display panel, and is particularly directed to using reflected sunlight to backlight a display panel of an automated teller machine (ATM).

Many types of display panels having viewable display screens are known. Some types of display panels require backlighting to enable a person viewing the display screen of the display panel to see information appearing on the display screen. A liquid crystal display (LCD) panel is an example of a display panel which requires backlighting to enable a person to view information appearing on the display screen. Typically, a light source such as an energizable incandescent bulb is located behind the LCD panel. The incandescent bulb, when energized, enables the person to view information appearing on the display screen of the LCD panel.

When the LCD panel is used in an environment which has bright sunlight, it may be difficult to read information appearing on the display screen unless the light source behind the LCD panel is bright enough to overcome the brightness of the sunlight. However, the use of a larger light source results in more generated heat. The generation of excessive heat may lead to an overheating condition.

SUMMARY OF THE INVENTION

In accordance with one aspect of the present invention, a method of backlighting a display panel having a back side and a front side comprises the steps of (a) illuminating the back side of the display panel with light from a light source located in the vicinity of the back side of the display panel, and (b) illuminating the back side of the display panel with reflected sunlight to supplement the light from the light source in step (a) to enable the front side of the display panel to be viewed. The reflected sunlight is focused towards the back side of the display panel.

In accordance with another aspect of the present invention, a method of providing reflected sunlight on the back side of a display panel of an automated teller machine (ATM) to enable an ATM customer at the front side of the display panel to view the front side of the display panel with improved contrast comprises the steps of (a) receiving sunlight in the vicinity of the back side of the display panel, (b) reflecting the sunlight of step (a), and (c) directing the reflected sunlight of step (b) towards the back side of the display panel to backlight the display panel to enable the ATM customer to view the front side of the display panel.

In accordance with yet another aspect of the present invention, an apparatus comprises a display panel having a back side and a front side. Means is provided for (i) reflecting sunlight and (ii) directing the reflected sunlight towards the back side of the display panel such that the reflected sunlight backlights the display panel to enable the front side of the display panel to be viewed. Preferably, the display panel is of the liquid crystal display (LCD) type. The means includes a lens system which focuses the reflected sunlight towards the back side of the display panel, and a mirrored surface which receives sunlight and reflects the sunlight towards the lens system. Preferably, the mirrored surface is parabolic.

In accordance with still another aspect of the present invention, an apparatus for supplementing the extent of backlighting of a display panel comprises a reflecting unit located in the vicinity of the back side of the display panel and for reflecting sunlight. The apparatus further comprises an optical unit for (i) receiving the reflected light, and (ii) directing the reflected sunlight towards the back side of the display panel to supplement the extent of backlighting of the display panel to enable the front side of the display panel to be viewed. The optical unit includes a lens system which focuses the reflected sunlight towards the back side of the display panel. The reflecting unit includes a mirrored surface which receives sunlight and reflects the sunlight towards the lens system. Preferably, the mirrored surface is parabolic.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a schematic illustration of a sectional view taken approximately along line 3—3 of FIG. 1.

DETAILS OF THE INVENTION

Figure 1:
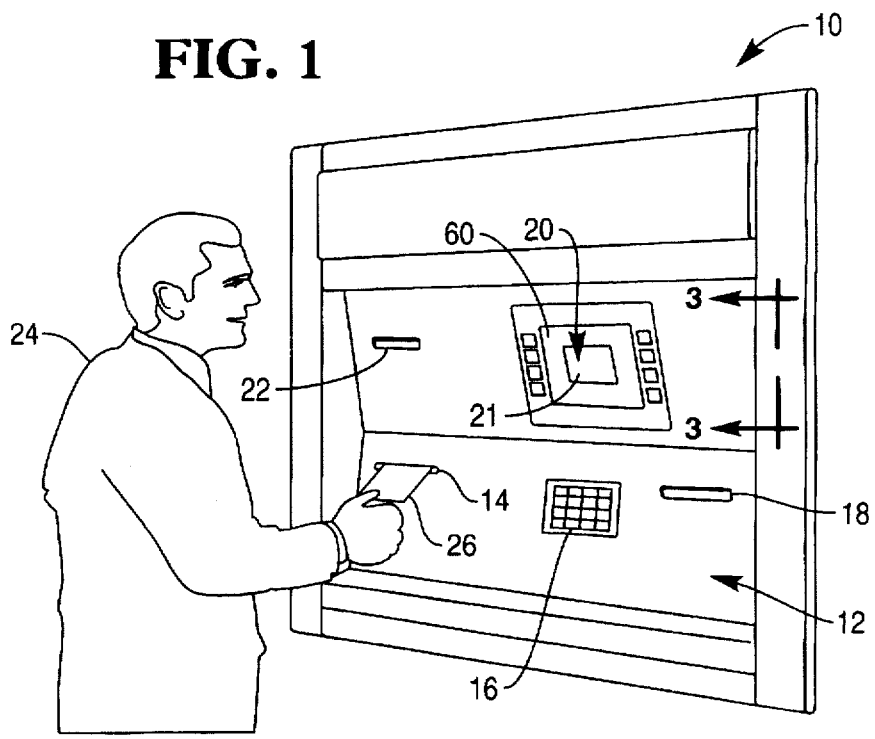
FIG. 1 is a perspective view of an automated teller machine (ATM) embodying an apparatus constructed in accordance with the present invention.

The present invention is directed to using reflected sunlight to backlight a display panel. The specific construction and use of the display panel may vary. By way of example, an automated teller machine (ATM) 10 embodying the present invention is illustrated in FIG. 1.

The ATM 10 comprises a user interface in the form of a front panel 12. The front panel 12 includes a card reader 14, a key pad 16, a cash dispenser 18, a liquid crystal display (LCD) panel 20 having a display screen 21, and a receipt printer 22. The card reader 14 has a card slot through which a customer 24 can insert a user's identifying card 26 at the commencement of a transaction to be conducted by the customer 24. The cash dispenser 18 has a cash slot through which cash currency notes stored inside the ATM 10 can be delivered to the customer 24 during the transaction. The receipt printer 22 has a receipt slot through which a receipt of the transaction is delivered to the customer 24 at termination of the transaction.

When the customer 24 inserts the user's identifying card 26 into the card slot of the card reader 14, the card reader reads data contained on the card. The customer 24 is then prompted on the display screen 21 of the LCD panel 20 to enter a personal identification number (PIN) via the key pad 16. After the correct PIN is entered, menus are displayed on the display screen 21 to enable the customer 24 to carry out the desired transaction. After the transaction is completed, the receipt printer 22 prints a receipt of the transaction and delivers the receipt through the slot of the receipt printer 22 to the customer 24.

Figure 2:
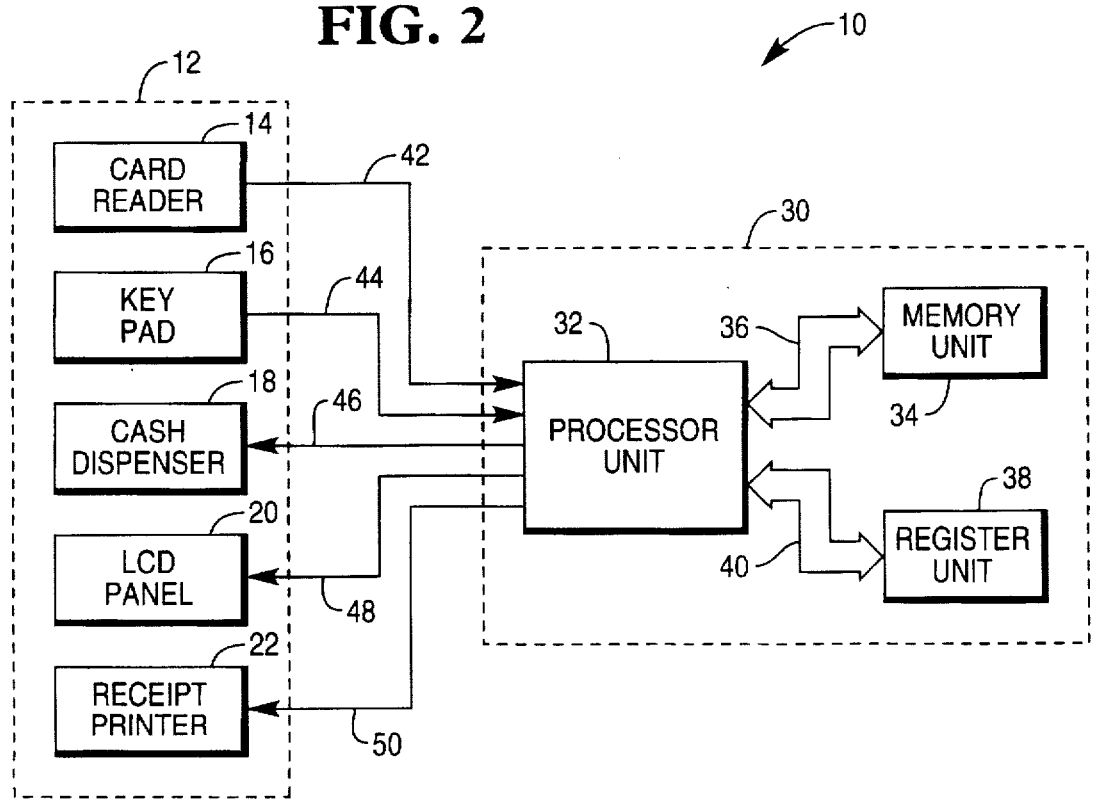
FIG. 2 is a block diagram representation of the ATM of FIG. 1.

Referring to FIGS. 1 and 2, the ATM 10 further comprises a controller unit 30 which communicates with components of the front panel 12. The controller unit 30 includes a processor unit 32, and a memory unit 34 connected via bus line 36 to the processor unit 32. The processor 32 receives input signals on lines 42, 44 from the card reader 14 and the key pad 16, respectively, and provides output signals on lines 46, 48, 50 to the cash dispenser 18, the LCD panel 20, and the receipt printer 22, respectively, to control the amount of cash dispensed by the cash dispenser 18, the information displayed on the display screen 21 of the LCD panel 20, and the information printed by the receipt printer 22. The processor unit 32 may include a microcomputer, and the memory unit 34 may be non-volatile RAM. Suitable microcomputers and memories are readily available in the marketplace. Their structure and operation are well known and, therefore, will not be described.

As shown in FIGS. 1 and 3, a transparent non-reflective piece 60 encircles the outer periphery of the LCD panel 20. A lens system 64 is located behind the LCD panel 20 as shown in FIG. 3. A mirrored surface 66 is located behind the lens system 64. Preferably, the mirrored surface 66 is parabolic in shape.

A light source 68 such as an incandescent bulb is located between the lens system 64 and the mirrored surface 66, as shown in FIG. 3. The light source 68 provides light rays (represented by arrows 62 in FIG. 3) which are directed towards the lens system 64. The lens system 64 focuses the light rays 62 from the light source 68, and directs these focused light rays towards the back side of the LCD panel 20 to provide backlighting for the LCD panel 20.

In accordance with the present invention, incoming sunlight 72 is transmitted through the transparent non-reflective piece 60 and then reflected from the mirrored surface 66 towards the lens system 64. The arrows representing the transmitted sunlight rays are designated with reference numeral 74, and the arrows representing the reflected sunlight rays are designated with reference numeral 76. In turn, the lens system 64 focuses the reflected sunlight rays 76 and directs the focused light rays towards the back side of the LCD panel 20. The arrows representing the focused light rays from the reflected sunlight rays 76 are designated with reference numeral 78.

It should be apparent that the sum total of light rays focused towards the back side of the LCD panel 20 is a combination of light rays originating from the light source 68 and light rays originating from the incoming sunlight 72. The light rays originating from the incoming sunlight 72 supplement the light rays originating from the light source 68 to provide more backlighting for the LCD panel 20 to enable the front side of the display panel to be viewed with improved contrast.

A number of advantages result by using light rays originating from the incoming sunlight 72 to provide more backlighting for the LCD panel 20. One advantage is that the size of the light source 68 can be made smaller since light rays originating from the incoming sunlight 72 are used to supplement the light rays originating from the light source 68. The result is less power consumption and less generated heat during operation of the light source 68 to provide backlighting for the LCD panel 20.

Although the foregoing describes a system in which the light source 68 is used to provide backlighting for the LCD panel 20, it is conceivable that the light rays originating from the incoming sunlight 72 may provide sufficient backlighting for the LCD panel 20 such that the light source 68 may not be required.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service terminal for allowing a customer to carry out a transaction, the self-service terminal comprising:

a card reader for receiving a customer identifying card from the customer and reading data from the card to verify the identity of the customer;

a display panel having a back side and a front side for displaying information to be viewed by the customer while the customer is carrying out the transaction;

a transparent piece encircling at least a portion of the display panel and through which sunlight can be transmitted; and an optical unit located in the vicinity of the back side of the display panel for (i) receiving sunlight transmitted through the transparent piece, (ii) reflecting the received sunlight, and (iii) directing the reflected sunlight towards the back side of the display panel to backlight the display panel to enable the customer to view the front side of the display panel while the customer is carrying out the transaction;

the optical unit including a lens system which focuses the reflected sunlight towards the back side of the display panel, the optical unit including a mirrored surface which receives sunlight and reflects the sunlight towards the lens system, the mirrored surface being parabolic.

2. A self-service terminal according to claim 1, wherein the display panel is of the liquid crystal display (LCD) type.

3. A self-service terminal for allowing a customer to carry out a transaction, the self-service terminal comprising:

a card reader for receiving a customer identifying card from the customer and reading data from the card to verify the identity of the customer;

a display panel having a back side and a front side for displaying information to be viewed by the customer while the customer is carrying out the transaction;

a reflector unit for receiving sunlight and reflecting the sunlight; and a lens system positioned between the back side of the display panel and the reflector unit for focusing reflected sunlight from the reflector unit towards the back side of the display panel to backlight the display panel to enable the customer to view the front side of the display panel while the customer is carrying out the transaction;

the reflector unit including a mirrored surface which receives sunlight and reflects the sunlight towards the lens system, the mirrored surface being parabolic.

4. A self-service terminal according to claim 3, wherein the display panel is of the liquid crystal display (LCD) type.

* * * * *

UNITED STATES PATENT AND TRADEMARK OFFICE
CERTIFICATE OF CORRECTION

PATENT NO.   : 5,739,876
DATED        : April 14, 1998
INVENTOR(S)  : Mark J. Stewart It is certified that error appears in the above-indentified patent and that said Letters Patent is hereby corrected as shown below:

On the title page, item:

[54] "METHOD OF BACKLIGHTING A DISPLAY PANEL OF AN ATM" should be --[54] METHOD OF BACKLIGHTING A DISPLAY PANEL AND AN APPARATUS THEREFOR--

Signed and Sealed this

Twenty-sixth Day of January, 1999

Attest:

Attesting Officer

Acting Commissioner of Patents and Trademarks